(No Model.)
J. ANDERSON.
ROAD CART.
No. 365,562. Patented June 28, 1887.
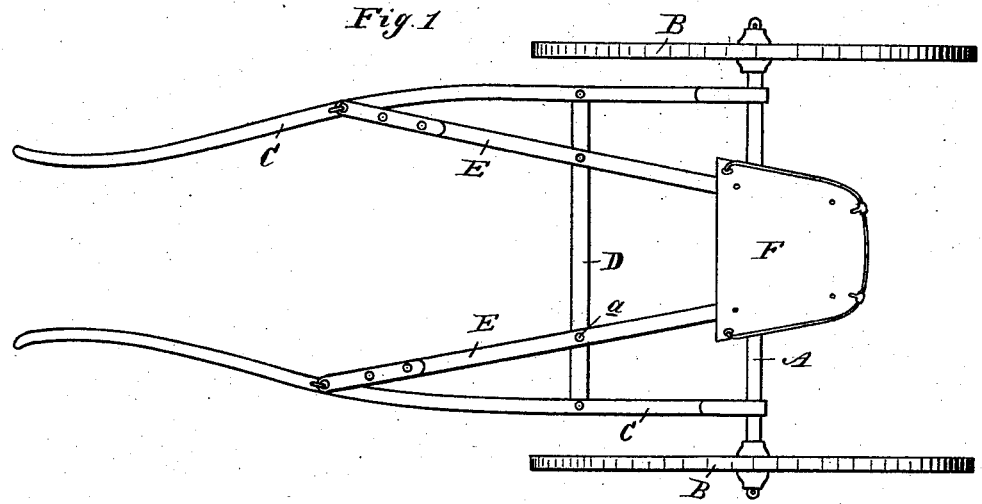
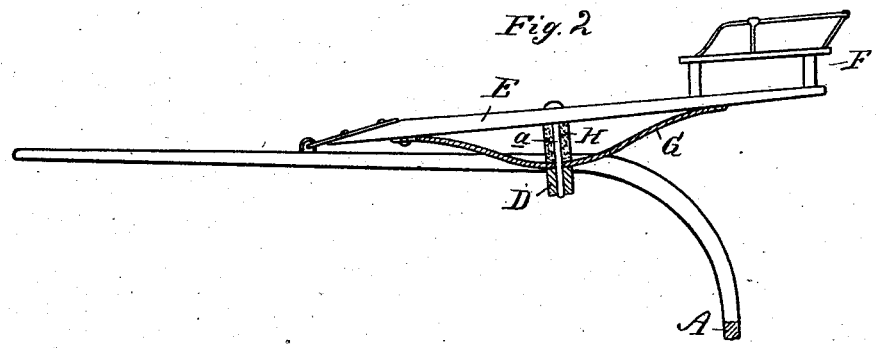
Attest:
John Schuman.
Inventor:
John Anderson.
by his Atty.

United States Patent Office.

JOHN ANDERSON, OF COLON, ASSIGNOR OF TWO-THIRDS TO ANDERSON BROS., OF LANSING, MICHIGAN.

ROAD-CART.

SPECIFICATION forming part of Letters Patent No. 365,562, dated June 28, 1887.

Application filed April 22, 1886. Renewed May 27, 1887. Serial No. 239,561. (No model.)

*To all whom it may concern:*

Be it known that I, JOHN ANDERSON, of Colon, in the county of St. Joseph and State of Michigan, have invented new and useful Improvements in Road-Carts; and I do hereby declare that the following is a full, clear, and exact description thereof, reference being had to the accompanying drawings, which form a part of this specification.

This invention relates to certain new and useful improvements in the construction of road-carts, which will be simple in construction, easy to keep in repair, economical to build, and light of draft.

The invention consists in the peculiar construction and combinations of the various parts, as more fully hereinafter described.

Figure 1 is a plan view of my improved road-cart. Fig. 2 is a side elevation of the same with the wheel removed and partly in section.

In the accompanying drawings, A represents the axle, B the wheels, C the bent shafts, and D the cross-bar tying the shafts together, and all of the usual construction, except as hereinafter mentioned.

E are the seat-supports, the forward ends of which are hinged, one to each of the shafts, about midway between the intersection of the same with the cross-bar and their forward ends. These supports slope upwardly and inwardly to the rear, as shown, and upon their rear ends the seat F is secured above the axle, so that when the vehicle is in use the weight of the occupant will be immediately above or slightly in rear of the axle, but on a higher plane. Under each of these supports is placed a semi-elliptic spring, G, as shown, its center resting upon the cross-bar, while its ends support the seat, to the under side of which such ends are secured in any manner desired that will allow the spring to elongate under the weight imposed. Between the center of the spring and the seat-support the spring is re-enforced by a rubber spring, H, which is made of a section of rubber tubing. A bolt or pin, a, secured to the seat support, passes downward through such rubber spring, through the center of the spring G, and through a coincident hole in the cross-bar, securing the parts together without interfering with the vertical action of the springs.

What I claim as my invention is—

The combination, with the shaft C and cross-bar D, of the seat-supports E, hinged at their forward ends to said shafts, the semi-elliptic springs G, arranged beneath said seat-supports with their centers on said cross-bar, the springs H, interposed between said springs G and seat-supports over said cross-bar, and the bolts a, passed through said springs and cross-bar, substantially as shown and described.

JOHN ANDERSON.

Witnesses:
EDWIN R. HILL.
THOS. J. HILL.